(No Model.)

H. C. SPALDING.
SAFETY DEVICE FOR ELECTRIC CIRCUITS.

No. 327,499. Patented Sept. 29, 1885.

WITNESSES
W. H. Doggett.
W. Frisby

INVENTOR
Henry C. Spalding
By Parker W. Page
atty.

UNITED STATES PATENT OFFICE.

HENRY C. SPALDING, OF BOSTON, MASSACHUSETTS.

SAFETY DEVICE FOR ELECTRIC CIRCUITS.

SPECIFICATION forming part of Letters Patent No. 327,499, dated September 29, 1885.

Application filed February 21, 1884. Renewed May 21, 1885. (No model.)

*To all whom it may concern:*

Be it known that I, HENRY C. SPALDING, a citizen of the United States, residing at Boston, in the county of Suffolk and State of Massachusetts, have invented certain new and useful Improvements in Safety Devices for Electric Circuits, of which the following is a specification, reference being had to the drawings accompanying and forming a part of the same.

The subject of this my application is a device for protecting, against the effects of abnormal charges of electricity, the conductors and insulation of circuits of any kind and the devices connected with them.

The invention, though thus generally applicable, is more particularly designed for use with circuits partly subterranean or subaqueous, in which the buried conductors are assembled closely together and surrounded by insulating material, and with those circuits in which delicate electrical instruments—such as relays or telephones—are employed. Such circuits are often liable to receive excessive charges, which may disrupt the insulating covering of the conductors or fuse the coils of the instruments connected with them. These abnormal charges may be produced by atmospheric discharges, or may be received from some other circuit—for example, by the contact of the lines with those of an electric-light circuit.

In other applications I have shown and described devices for breaking a circuit, or cutting out either the insulated parts or the electrical devices when such accidents occur. The fundamental principles of these devices are embodied in my present invention, which also involves other features of novelty that render it a valuable element in such cases as I have described.

Figure 1:
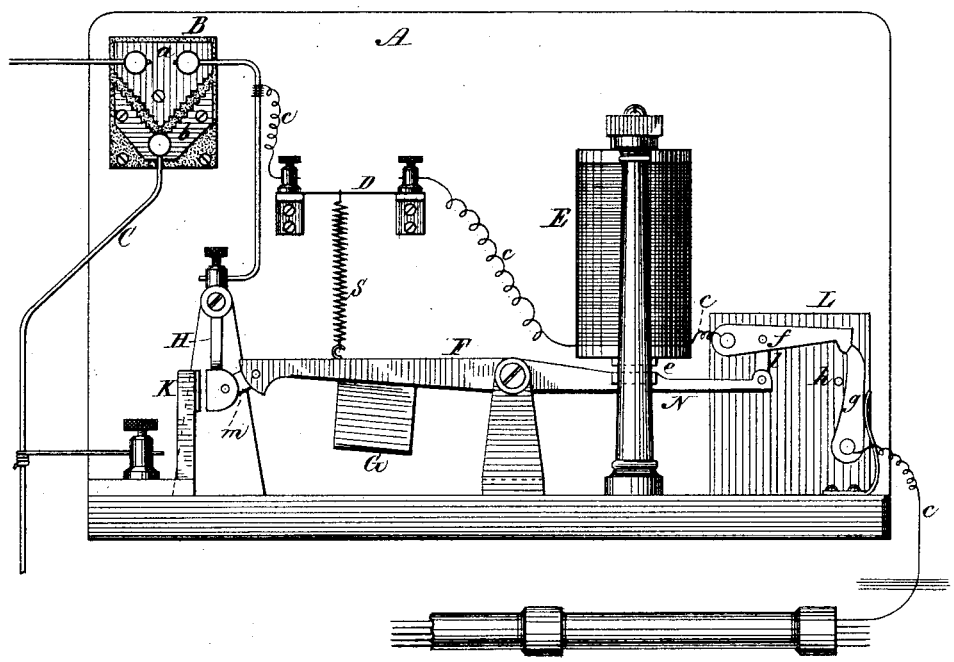
Figure 2:
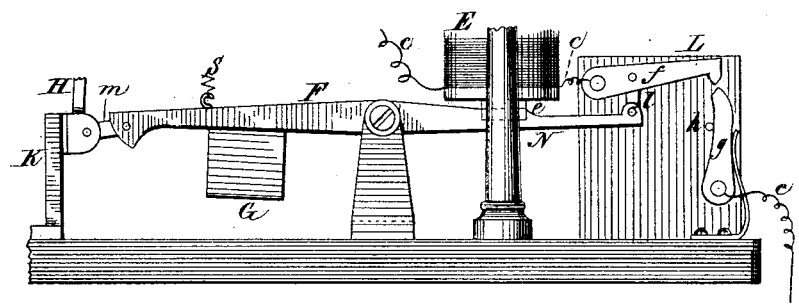

I will describe my invention by reference to the accompanying drawings, in which Figure 1 is a side elevation of the apparatus complete in connection with an underground system. Fig. 2 is an elevation of a portion of the same, showing the parts in another position.

The operative portions of the apparatus are secured to a suitable frame or support (designated by the letter A.) To a convenient part of this support, or upon a block, B, of insulating material secured thereto, are fixed the corrugated plates $ab$ of an ordinary lightning-arrester. Upon these plates are binding-posts, by means of which one of the plates, $a$, is connected by a wire, C, with earth.

D is a block, strip, or wire of a metal having a higher specific resistance than that of the conductors of the circuit with which it is connected. It constitutes a fusible safety-strip similar to those heretofore employed.

E is an electro-magnet, the coils of which are included in the circuit with plate $a$ and strip D, the connection between the latter being established by a conductor, $c$, from one of the binding-posts of plate $a$, or a conductor connected therewith. Magnet E is supported in a frame, with its poles down, and below it is pivoted a lever, F, of insulating material, and carrying an armature, $e$. On the opposite side of the fulcrum the lever F is connected by a spiral spring, S, to the strip D, the spring operating, under normal conditions, to maintain the armature $e$ away from the poles of magnet E.

In order to render the action of the lever more positive I attach to it a weight, G, compensating for the same by making the spring S stouter than heretofore.

To a standard set on the base of the instrument is pivoted a contact-arm, H, connected with the lever F by a link or toggle, $m$.

In the path of movement of the contact-arm H is a stop, K, in electrical contact with the wire C, and hence to earth. The contact-arm H, or the standard on which it is supported, is connected with the plate $a$ of the lightning-arrester. Beyond the armature $e$ the lever F extends in an arm, N, the end of which is connected by a link, $n$, with a contact-lever, $f$, pivoted to an insulating-support, L, and connected with the circuit C. The lever $f$ encounters in its normal position a second lever, $g$, pivoted to the support L, and held against the end of lever $f$ by a light spring. From lever $g$ the conductor C is continued to the underground portion of the circuit or to the instruments that it may be desirable to protect from injury.

When the instrument is used with an electric circuit, the path for the current, so long as its strength does not exceed that predetermined by the construction or adjustment of the parts described, is through the plate a, strip D, and coils of magnet E. The attractive force of magnet E for such currents should not be capable of moving the lever F.

The instrument acts in the following manner: A discharge of static electricity entering the line will usually leap across the space between the plates a and b and go to earth. An abnormal flow of current, due to similar causes, which does not take this course will either fuse the strip D or raise the armature e, either of which interrupts the circuit between levers f and g, and closes it from plate a to earth through the arm H, thus permitting the excess of current to pass off to earth. By the rupture of the circuit through conductor C, the magnet E loses its attractive force, armature e falls, and lever f is brought down again into contact with lever g. The ends of these levers are beveled, so that when thus brought together the lever g will be moved back from a stop, K, against the force of the spring, thus securing good contact. If the interruption of the circuit through C has been produced by the action of the magnet and not by the fusing of strip D, the circuit will be re-established through the line after a momentary contact of lever H and stop K. Should the abnormal flow of current continue after the return of the parts to their original position, a vibration of the lever F will take place that prevents the excess of current from doing injury to the line, while it leaves the circuit complete after the excessive flow has ceased.

I do not confine myself to the specific details of construction herein described. For example, the lever F may be connected in any other way to the levers H and f, and other changes made which do not materially affect the invention.

I am aware that in certain electro-magnetic apparatus the armature of an electro-magnet has been caused, when attracted by the influence of the magnet, to close a shunt around the magnet. In safety devices of the kind I have described, however, it is essential not only that a path for the current be provided around the magnet, but that at the same time the portion of the circuit in which the magnet is included be entirely interrupted, otherwise an abnormal current would, by following both circuits, produce the very effects which it is my object to guard against.

What I claim in this application is—

1. In a safety device for electric circuits, the combination, with a fusible safety-strip, an electro-magnet, and a pivoted armature-lever connected by a spring with the safety-strip, of a circuit-breaker and shunting device connected with the lever, and constructed and arranged for operation in substantially the manner set forth.

2. In a safety device for electric circuits, the combination, with a fusible safety-strip, an electro-magnet, and pivoted armature-lever weighted and connected by a spring with the safety-strip, of a circuit-breaker and shunting device connected with the lever, and constructed and arranged for operation in substantially the manner described.

3. In a safety device, the combination, with an electro-magnet and pivoted armature, of a circuit-breaker and a shunting device, each comprising as the means for operating them a pivoted lever, and links connecting the pivoted armature with said levers, whereby a movement of the armature is imparted to the levers, substantially as and for the purpose specified.

4. In a safety device for electric circuits, the combination, with a safety-strip, an electro-magnet, and a pivoted armature connected by a spring with the safety-strip, of a circuit-breaker and a shunting device, each comprising as the means for operating them a pivoted lever and links connecting the pivoted armature with said levers, whereby a movement of the armature is imparted to the levers, substantially as and for the purpose specified.

In testimony whereof I have hereunto set my hand this 8th day of January, 1884.

HENRY C. SPALDING.

Witnesses:
SANFORD H. DUDLEY,
WARREN P. DUDLEY.